United States Patent
Franzolin

(10) Patent No.: US 8,712,561 B2
(45) Date of Patent: Apr. 29, 2014

(54) METHOD FOR SPECIFYING CONTROL CURVE PARAMETERS FOR CONTROLLING CLIMATIC ENVIRONMENTAL CONDITIONS OF CLIMATE-CONTROLLED ENCLOSED SPACES

(75) Inventor: Enrico Franzolin, Vigodarzere (PD) (IT)

(73) Assignee: Unox S.p.A., Vigodarzere (IT)

( * ) Notice: Subject to any disclaimer, the term of this patent is extended or adjusted under 35 U.S.C. 154(b) by 476 days.

(21) Appl. No.: 13/017,853

(22) Filed: Jan. 31, 2011

(65) Prior Publication Data

US 2011/0202179 A1    Aug. 18, 2011

(30) Foreign Application Priority Data

Feb. 3, 2010 (IT) .............................. PD2010A0025

(51) Int. Cl.
*G06F 19/00* (2011.01)

(52) U.S. Cl.
USPC ................. 700/83; 700/17; 700/89; 700/180; 700/275; 700/299

(58) Field of Classification Search
USPC .................... 700/17, 83, 89, 180, 275, 299
See application file for complete search history.

(56) References Cited

U.S. PATENT DOCUMENTS

| | | | | |
|---|---|---|---|---|
| 4,394,896 A | * | 7/1983 | McComas et al. | 198/341.06 |
| 4,962,840 A | * | 10/1990 | Miura et al. | 198/347.1 |
| 5,694,535 A | * | 12/1997 | Broekhuijsen | 345/442 |
| 5,731,820 A | * | 3/1998 | Broekhuijsen | 345/442 |
| 5,826,496 A | * | 10/1998 | Jara | 99/443 C |
| 6,204,861 B1 | * | 3/2001 | Chen | 345/442 |
| 6,682,670 B2 | * | 1/2004 | Lullwitz et al. | 264/40.3 |
| 6,987,246 B2 | * | 1/2006 | Hansen et al. | 219/401 |
| 7,626,589 B2 | * | 12/2009 | Berger | 345/582 |
| 2008/0177413 A1 | * | 7/2008 | Gaegauf et al. | 700/114 |

FOREIGN PATENT DOCUMENTS

WO    2009097340 A2    8/2009

* cited by examiner

*Primary Examiner* — Michael D Masinick
(74) *Attorney, Agent, or Firm* — Volpe and Koenig, P.C.

(57) ABSTRACT

A method is provided for specifying the parameters of control curves of equipment for controlling the environmental conditions of climate-controlled enclosed spaces, including the step of specifying at least one control curve for the equipment, which is formed by a sequence of pairs of values introduced in succession. Each pair identifying the value of a predetermined parameter in a corresponding instant of time, the curve, indicating the desired variation of the parameter in time, is used for reproducing the variation of the parameter in time in said space according to the specified curve. The method also includes preliminary plotting of the shape of a curve in a graphic system of Cartesian axes. The curve represents a previously selected variation of the predetermined parameter as a function of time.

9 Claims, 1 Drawing Sheet

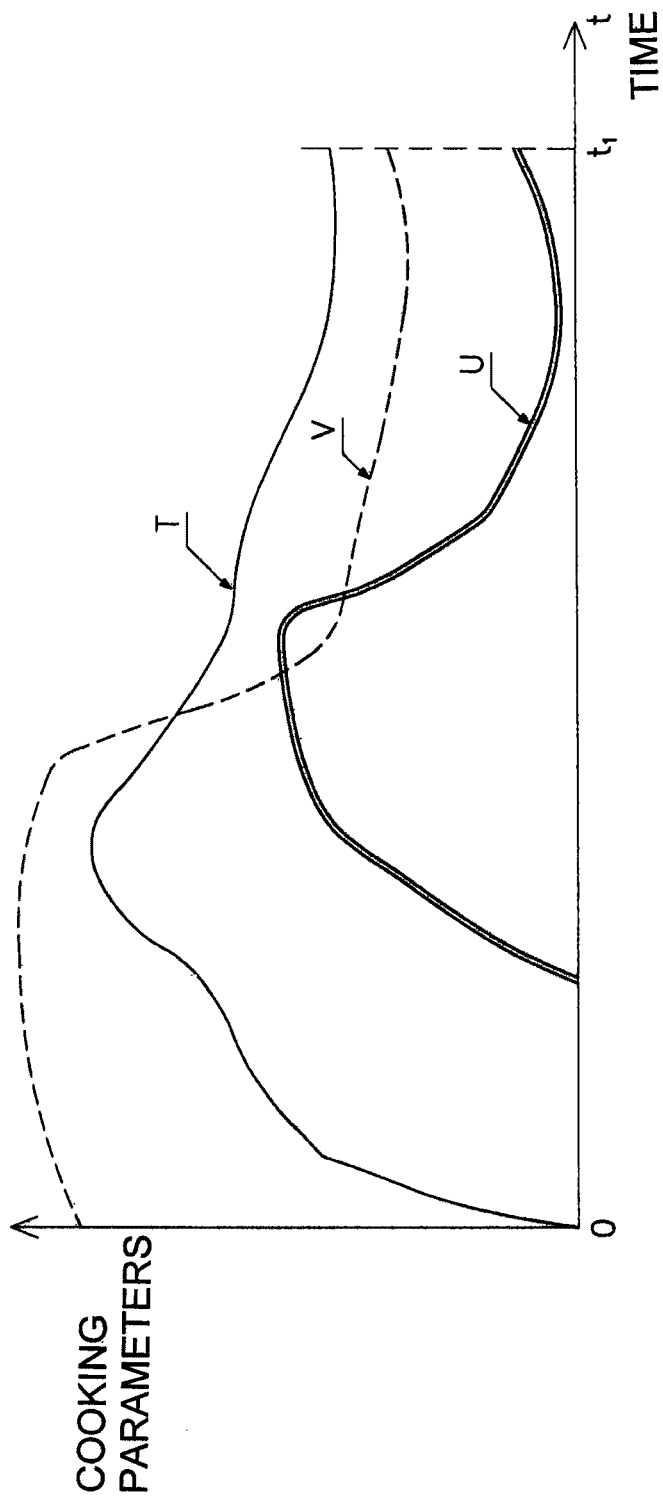

METHOD FOR SPECIFYING CONTROL CURVE PARAMETERS FOR CONTROLLING CLIMATIC ENVIRONMENTAL CONDITIONS OF CLIMATE-CONTROLLED ENCLOSED SPACES

FIELD OF INVENTION

The present invention relates to a method for specifying the parameters of control curves of equipment for controlling the climatic environmental conditions of climate-controlled enclosed spaces, having the characteristics stated in the preamble of claim 1 which is the principal claim.

BACKGROUND

The invention is particularly, but not exclusively, applicable to the technical field of systems for controlling parameters relating to the climatic environmental conditions of enclosed spaces. This general term signifies not only enclosed spaces such as the cooking chambers of ovens for foods but also climate-controlled rooms or public environments. In the first case, the cooking chamber is considered to be a climate-controlled space in which some parameters, such as the temperature and humidity, are specified and controlled in their variation in time, in corresponding cooking cycles. In the second case, these parameters can be specified and controlled in time for the climate control of environments such as the rooms of buildings. In both cases, the climate control system includes equipment which is suitably regulated and controlled to provide the predetermined values of the aforementioned parameters.

Typically, the predetermined control curves of these parameters are specified by providing interfaces by means of which the operator can enter, for each parameter, sequences of pairs of values representing the variation of the parameter as a function of time in a predetermined time interval. In cooking ovens, for example, there are known methods of specifying the parameters of a predetermined cooking cycle, wherein the operator has to enter numeric sequences of the aforesaid type, which express the desired curves of variation of the parameters during the cooking cycle. The entry of these sequences, normally carried out using interfaces with alphanumeric keypads, is a rather time-consuming operation which is not particularly convenient for the operator, since it takes a considerable time and does not provide the operator with a simple immediate display of the data entered. Other setting procedures require the entry of the pairs of values for each control curve by means of knobs for selecting the predetermined numeric values. These methods also suffer from the limitations mentioned above and from the complexity due to the time taken by the operator to set the data.

The limits and problems encountered by the operator of a cooking oven, who may be an ordinary cook rather than an expert user of the oven, are also encountered by an operator who has to specify the control curves of a climate control system for environments. The problem in question is therefore common to both of the technical fields mentioned above.

The fundamental problem of the invention is that of providing a method for specifying the aforesaid parameters which is functionally designed in such a way that the limitations of the aforementioned prior art can be overcome.

SUMMARY

This problem is resolved by the invention by using a method according to the claims attached below for specifying the parameters of control curves of equipment for controlling the climatic environmental conditions of climate-controlled enclosed spaces.

BRIEF DESCRIPTION OF THE DRAWING

Other features and advantages of the invention will be made clear by the following detailed description of a preferred example of embodiment thereof, illustrated for guidance and in a non-limiting way with reference to the single attached drawing which shows a schematic view of a set of control curves of corresponding parameters specified in a cooking oven for food according to the method of the present invention.

DETAILED DESCRIPTION OF THE PREFERRED EMBODIMENT(S)

The method of specifying values according to the invention will now be described with reference to the system for specifying the cooking parameters for a cooking chamber of an oven for food (not shown).

In this context, the essential parameters for controlling a cooking cycle of the oven are the temperature (T), the humidity (U) and the velocity (V) of rotation of a fan placed inside the oven and designed to force the circulation of air in the chamber and promote the transmission of the heat which is generated in the chamber and transferred to the food to be cooked.

In this method, the variation curves are specified together with the time for each of these parameters, in a predetermined time interval corresponding to the desired cooking cycle. Clearly, the oven is provided, in a known way, with all the necessary devices for generating the environmental conditions in the cooking chamber which reflect the specified values of the aforesaid parameters.

In a preliminary step of the method of specifying the values according to the invention, an operator plots the shapes of the predetermined control curves in a suitable medium which can translate each plotted curve into a sequence of points in a graphic system of Cartesian axes, each point having corresponding coordinates which can be read in the aforesaid Cartesian reference system.

In the method, each curve is plotted by manual control of the movement of the plotting means on the medium, this procedure being equivalent in all respects to the drawing of a two-dimensional curve made by hand on a graphic medium which bears a reference system in the form of Cartesian axes.

With reference to the attached drawing, the system of Cartesian axes shows the values of the corresponding cooking parameters (T, U, V) on the vertical axis and time (t) on the horizontal axis. When a predetermined time interval t1, such as the duration of the selected cooking cycle, has been identified, the operator draws the curves reflecting his chosen variation of the temperature T, the humidity U and the fan velocity V in time. Each point of each of the plotted curves is therefore marked by a pair of coordinates identifying the value of the corresponding parameter in a predetermined instant of time.

The aforesaid curves are preferably plotted by using a stylus for graphics tablets, made to slide in contact with the touch screen of the tablet, which comprises, in a known way, means for displaying the plot which is drawn, together with the coordinates of each plotted point of the curves. The graphics tablet is also conveniently associated with means for reading and storing the plotted curves, preferably in the form of sequences of pairs of values (parameter and time) for each of said curves in the system of Cartesian axes.

Alternatively, the plotting can be carried out with a touch screen on which the end of the operator's finger is moved in contact with the screen, to draw the curve of the corresponding parameter with the predetermined variation as a function of time.

In another alternative method, the curves can be plotted by the operator with the aid of a pointing means on a screen with a graphic interface, with manual control of the movement of the pointer on the screen, in an equivalent procedure to that used in graphics programs for computers in which the lines are plotted by the movement of a pointing device such as a mouse, moved manually by the operator over a surface.

In another alternative method, the plotting can be carried out more simply by drawing the curves on a paper medium and then digitally scanning the curves, in order to import the curve with reference to a system of Cartesian axes and then convert it by means of a suitable program into a sequence of points belonging to the curve, each point being marked by a corresponding pair of coordinates in the predetermined reference system.

The aforesaid plotting step used for specifying the predetermined cooking parameters has the advantage of being easy and fast for the operator, because it reflects as naturally as possible the way in which the operator conceives and imagines the variation of the cooking parameters for individual foods during the cooking cycle, thus enabling the operator to translate this variation in a highly simple and natural way into a pattern which is immediately plotted and displayed, without any further processing in numerical terms in the parameter entry step, whereas such processing would be required in the known solution.

In a subsequent step of the method, the curves plotted by the operator are processed in a processing unit associated with the oven control unit, in order to obtain for each curve a sequence of points belonging to the curve or correlated with it, positioned in sequence with a predetermined time interval, each point being identified by a pair of coordinates (value of parameter and instant of time) relating to the system of Cartesian axes, said sequence reflecting the predetermined variation of the parameter as a function of time along the corresponding curve.

In this step, principles are specified for the acquisition of said sequences, these principles being alternatives to each other. According to a first principle, the coordinates of the points of each curve read with a certain time interval are simply acquired. According to another principle, the coordinates can be interpolated within each time interval, with the definition of a mean value from the values acquired at the end points of each scanning interval (corresponding to the time interval). Clearly, other interpolation principles can be chosen in order to meet specific requirements.

For each control curve, therefore, a corresponding sequence of pairs of coordinates is generated, these coordinates corresponding to the sequence of predetermined points along the curve, and this sequence is transferred, in a subsequent step of the method, to the oven control unit, in order to operate corresponding devices of the oven designed to reproduce the variation of the previously specified parameters in time. In the specific case considered here, systems for generating heat and humidity in the cooking chamber are activated, and the fan velocity is set in such a way that the sequence of values of the parameters T, U and V which have been specified are reflected in the operation of the oven during the cooking cycle of a predetermined food.

Other functions can be provided subsequently in association with the method for specifying the cooking parameters according to the invention.

Since each set of curves T, U, V corresponds to a predetermined cooking cycle for a certain food, it is possible to arrange for a plurality of sets of these curves, identifying corresponding cooking cycles of corresponding foods, to be generated and stored in a storage medium, thus making it possible for a predetermined cooking cycle, chosen from those stored in a kind of database kept on the storage medium, to be searched for and transferred to the oven in a simple way. It is also possible to associate each set with an image of the food, created for example from a photographic reproduction of the food acquired at the end of the cooking cycle, in order to make it quicker and easier to retrieve any given cooking process from the database by associating it with the image of the food.

In order to implement the method for specifying the parameters according to the invention, an interface means is provided between the operator and the oven control unit, according to the predetermined embodiment of the invention.

For example, it is possible to provide a touch screen mounted on the oven, on which the operator can plot the control curves of the predetermined parameters. The processing unit of the touch screen can include communication ports through which the control curves obtained previously and stored on suitable storage media can be transferred in digital form.

Thus the invention resolves the problem which was proposed and provides the aforementioned advantages over the known solutions.

A primary advantage is that the operator can specify the parameters extremely rapidly in a natural way which is adapted to the mental process of calculating the predetermined control curves, while an immediate display is provided even during the step of data entry.

What is claimed is:

1. A method for specifying the parameters of control curves of equipment for controlling the environmental conditions of climate-controlled enclosed spaces, comprising:

specifying at least one control curve for said equipment, said at least one curve being formed by a sequence of pairs of values introduced in succession, each pair identifying the value of a predetermined parameter in a corresponding instant of time, said curve indicating the desired variation of the parameter in time, the control curve produced in this way being intended for a control unit of the equipment for operating corresponding devices for reproducing the variation of the parameter in time in said space according to the specified curve, plotting, using a plotter having manually controlled movement, of the shape of a curve in a graphic system of Cartesian axes, said curve representing a previously selected variation of the predetermined parameter as a function of time, processing the shape of said curve in a processing unit associated with the equipment, in order to identify a sequence of points belonging to the curve or correlated therewith, these points being positioned in succession, each point being identified by a pair of coordinates (value of parameter and time) relating to the system of Cartesian axes, said sequence reflecting the previously selected variation of the parameter in time along said curve, at predetermined time intervals, and transferring the resulting sequence of pairs of values to a control unit of the equipment, to operate corresponding devices of the equipment which are designed to reproduce the variation of said parameter in time in said enclosed space, wherein said enclosed space is a cooking chamber of an oven for food and the method further comprises specifying parameters of temperature, humidity, and the rotation speed of a fan in said chamber, according to corresponding curves of the variation of said parameters with time, the set of said curves reflecting a previously selected cooking cycle for a predetermined food item, the set of said curves can be stored in a storage medium and can be transferred from the medium to the control unit of the equipment and wherein a plurality of said sets of curves can be specified and stored, each set being characteristic of the cooking cycle of a corresponding food item, provision being made to associate an image of said food item with the corresponding set of curves to facilitate retrieval from a database which contains said plurality of curves.

2. The method according to claim 1, wherein the step of plotting the curve is carried out with a touch screen.

3. The method according to claim 2, wherein the plotting of the curve is carried out with a pen device for a graphics tablet associated with a handwriting medium with a graphic interface.

4. The method according to claim 1, wherein the plotting step is carried out by the contact of a moving fingertip with a touch screen.

5. The method according to claim 1, wherein the plotting step is carried out by the movement of a pointer with manual control of the movement of the pointer on a screen with a graphic interface.

6. The method according to claim 5, wherein the plotting of the curve is carried out by manual movement of a computer pointing device.

7. The method according to claim 1, wherein the parameter is temperature or humidity created inside said space by the corresponding control curve.

8. The method according to claim 1, wherein the parameter is a speed of a fan positioned inside said space, said speed being variable with time according to the corresponding specified curve.

9. An interface device for specifying parameters of control curves of equipment for controlling the environmental conditions of climate-controlled enclosed spaces, operating according to the method of claim 1.

* * * * *